United States Patent [19]
Johnson

[11] Patent Number: 5,305,587
[45] Date of Patent: Apr. 26, 1994

[54] SHREDDING DISK FOR A LAWN MOWER

[76] Inventor: Stephen C. Johnson, 815 Crystal Spring Rd., Grand Rapids, Minn. 55744

[21] Appl. No.: 22,106

[22] Filed: Feb. 25, 1993

[51] Int. Cl.$^5$ ............... A01D 34/63; B02C 18/10
[52] U.S. Cl. .................... 56/16.9; 56/255; 56/503; 241/101.1; 241/101.7
[58] Field of Search .......... 241/101.1, 101.7, 296; 56/255, 295, 320.2, 16.9, 500, 501, 503

[56] References Cited

U.S. PATENT DOCUMENTS

| Re. 29,139 | 2/1977 | Messner | 56/13.1 |
|---|---|---|---|
| 2,706,372 | 2/1950 | Blydenburgh | 56/25.4 |
| 3,049,857 | 8/1962 | Shaw | 56/501 |
| 3,375,338 | 3/1968 | Delf | 200/157 |
| 3,790,094 | 2/1974 | Spicer | 241/101.1 |
| 3,797,212 | 3/1974 | Pursel | 56/255 |
| 3,808,782 | 5/1974 | McWilliams | 241/101.1 X |
| 3,905,181 | 9/1975 | Messner | 56/13.1 |
| 4,057,952 | 11/1977 | Brokaw | 241/101.7 X |
| 4,083,166 | 4/1978 | Haas | 56/13.7 |
| 4,189,903 | 2/1980 | Jackson et al. | 56/255 |
| 4,283,018 | 8/1981 | Richard | 241/101.1 |
| 4,306,331 | 12/1981 | Chernosky | 15/328 |
| 4,411,125 | 10/1983 | Strickland | 56/16.9 |
| 4,499,710 | 2/1985 | Bolton | 56/11.9 |
| 4,597,203 | 7/1986 | Middleton | 37/241 |
| 4,796,416 | 1/1989 | Bendig et al. | 241/101.1 X |
| 4,901,509 | 2/1990 | Leuz | 56/16.9 |
| 4,967,546 | 11/1990 | Forbush | 56/255 |
| 5,134,838 | 8/1992 | Swisher et al. | 56/16.6 |

FOREIGN PATENT DOCUMENTS

| 3139775 | 4/1983 | Fed. Rep. of Germany | 241/101.1 |
|---|---|---|---|
| 2518866 | 7/1983 | France | 56/255 |

*Primary Examiner*—David J. Bagnell
*Attorney, Agent, or Firm*—Hugh D. Jaeger

[57] ABSTRACT

A shredding disk for a lawn mower which attaches to the motor shaft and between the mower blade and the lawn mower deck. The shredding disk includes a disk member and a plurality of knives in a serrated fashion located inboard of the circumferential edge of the disk member. A feed tube is positioned on the top of the lawn mower deck and can be closed with a cap during regular mowing. The shredding disk is for shredding branches or twigs, such as those members which fall off trees.

7 Claims, 3 Drawing Sheets

SHREDDING DISK FOR A LAWN MOWER

BACKGROUND OF THE INVENTION

1. Field of the Invention

The present invention is for lawn mowers, and more particularly, pertains to a shredding disk for a lawn mower to shred small branches and twigs.

2. Description of the Prior Art

It has always been a problem when one is mowing their yard to dispose of small branches and twigs in a prompt and efficient manner. Usually it is required to either stack the small branches and twigs in a small pile, or to make a separate trip to a garbage can or a lawn bag, or even to a composite pile.

It is not economical for an individual to own a chipper, as chippers are expensive to purchase, dangerous to use and expensive to maintain. Chipper blades always need to be sharpened.

The present invention overcomes the disadvantages of the prior art by providing a shredding disk for a lawn mower, which can either be original equipment manufacture or for after-market sale.

SUMMARY OF THE INVENTION

The general purpose of the present invention is to provide a shredding disk for a lawn mower for shredding small branches and twigs. The shredding disk is easily installed between the lawn mower deck and the blade.

According to one embodiment of the present invention, there is provided a shredding disk for a lawn mower including a circular member, structure to attach the circular member to the lawn mower shaft, such as a key way or set screws, and a plurality of cutting knives about the circumferential edge. The branches or twigs are fed through a tube extending through the lawn mower deck, thereby not exposing an individual to any dangerous instruments.

Significant aspects and features of the present invention include a shredding disk which can either be original equipment or installed as an after-market accessory, and is safe to use by not exposing any moving elements to an individual during use. The safety feature is a cutting tube which extends through the deck of the lawn mower and requires that a branch or twig be pushed through the cutting tube during a shredding operation.

Having thus described the embodiments of the present invention, it is one object hereof to provide a shredding disk for a lawn mower for the shredding of small branches and twigs.

One object of the present invention is to provide a lawn mower with a tube on the top deck for the receiving of small branches and twigs for subsequent shredding. The tube precludes an individual from being exposed to any moving mechanical parts, such as the shredding disk or the lawn mower blade, both of which rotate on the same motor shaft.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
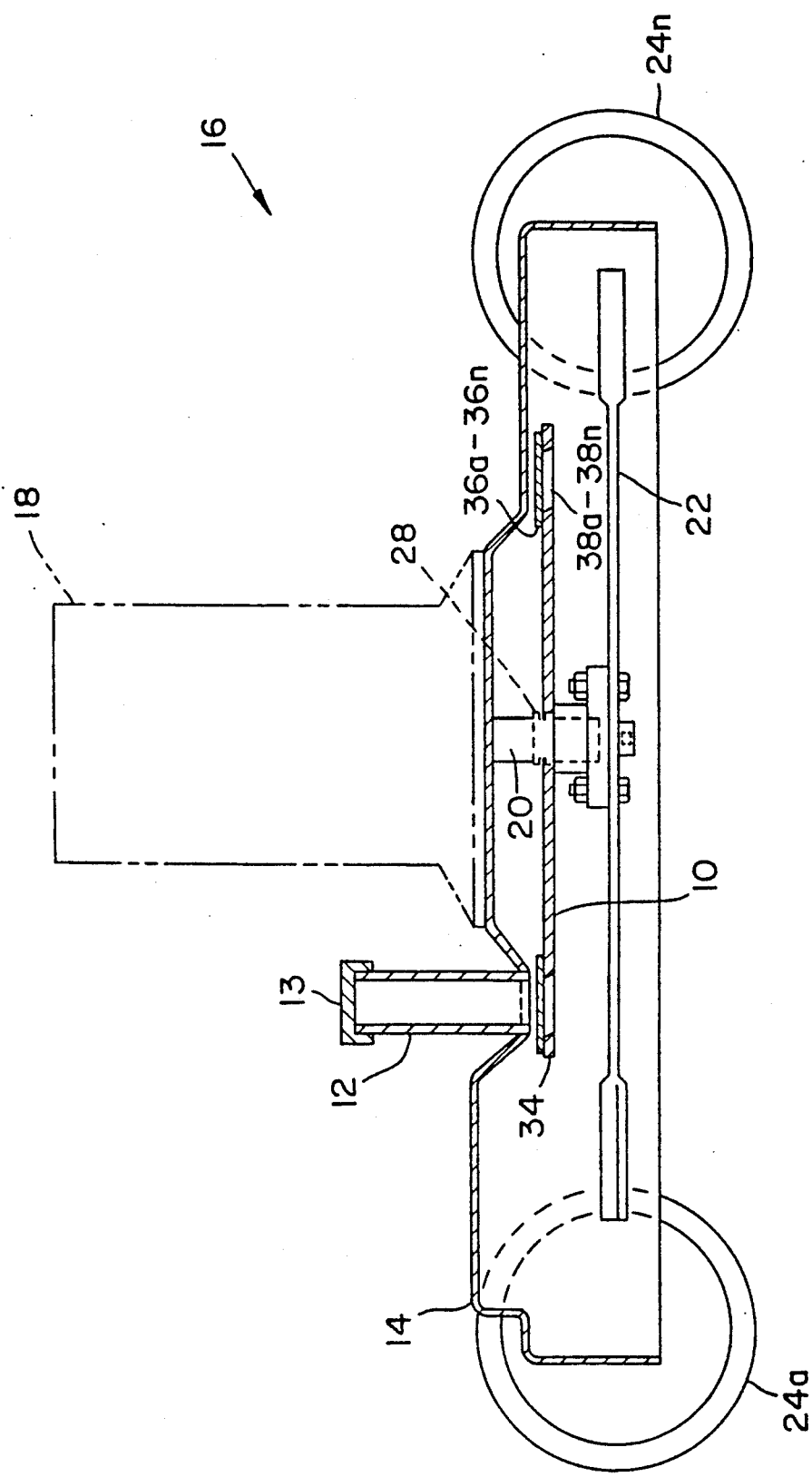
FIG. 1 illustrates a cross-sectional view of a shredding disk and a feed tube, the present invention, on a lawn mower.

FIG. 1 illustrates a cross-sectional view of a shredding disk 10, a feed tube 12, and a cap 13 fitted over the feed tube 12, the present invention, on a lawn mower deck 14 of a lawn mower 16. The lawn mower 16 includes a motor 18, a shaft 20, and a mower blade 22. A plurality of wheels 24a–24n attach to opposing ends of the lawn mower 16 by known structure. The shredding disk 10 includes a hub 28 with either a key-way and/or set screws.

Figure 2:
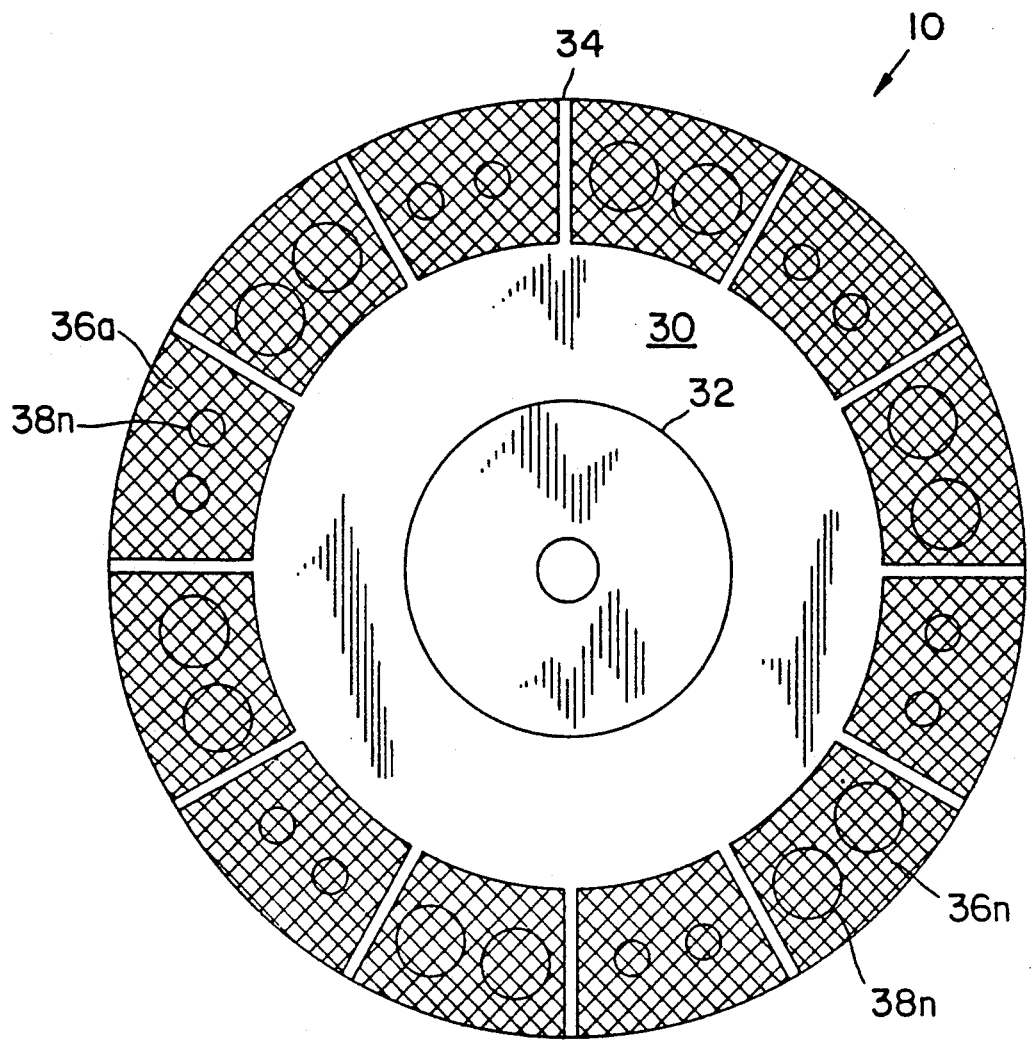
FIG. 2 illustrates a top view of the shredding disk.

FIG. 2 illustrates a top view of the shredding disk 10 including a circular disk 30, a hub 32 on the circular disk 30, a circumferential edge 34, and a plurality of shredding knives 36a–36n secured to the circular disk 30 inboard of the circumferential edge 34. Set screws, key-ways or other known attaching structure can be utilized to affix the hub 32 to the motor shaft of the lawn mower motor 18. The shredding knives 36a–36n are a plurality of blades angularly spaced with respect to each other, such as that commonly found on planes.

Figure 3:
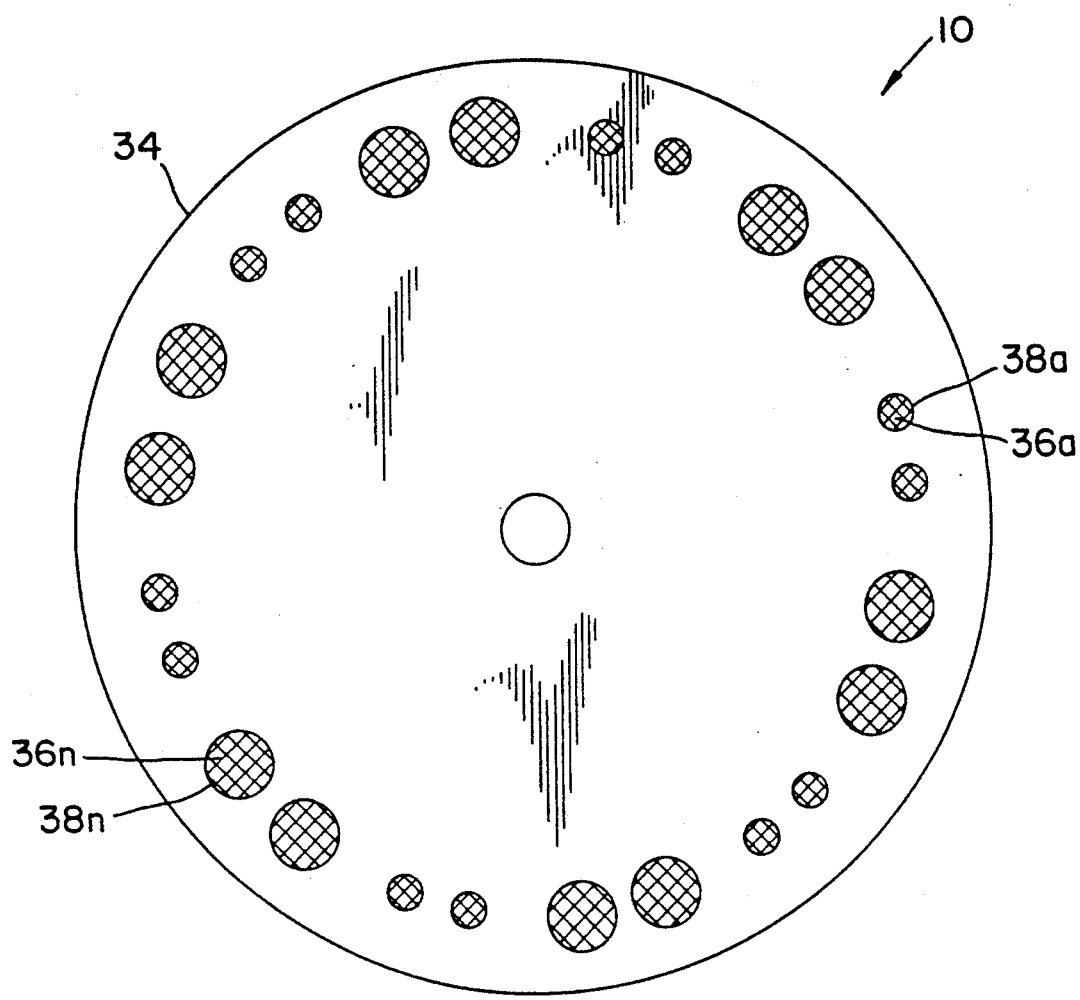
FIG. 3 illustrates a bottom view of the shredding disk.

FIG. 3 illustrates a bottom view of the shredding disk 10 where all numerals correspond to those elements previously described. A plurality of holes 38a–38n are provided inboard of the circumferential edge 34 opposing the shredding knives 36a–36n to provide for the passage of the shredded or chipped small branches or twigs. The holes 38a–38n can be any size or shape, as long as the holes 38a–38n provide for support of the shredding knives 36a–36n.

MODE OF OPERATION

The lawn mower 16 is used in a regular fashion for mowing grass. Once it is necessary to perform a shredding or chipping operation, then a cap is removed from the feed tube 12, and small branches or twigs are stuck down into the feed tube 12 to be cut by the knives 36a–36n, which shreds the small branch or twig, resulting in little chips of bark and wood, which subsequently integrates the grass and later forms compost during a normal decaying process. When sharpening of the knives 36a–36n is required, it is only necessary to insert a sharpening stone down through the feed tube 12, and sharpening will automatically occur. The shredding disk 10 is intended to be cost-effective, so that the shredding disk 10 can be replaced in a similar fashion to replacing a lawn mower blade.

Various modifications can be made to the present invention without departing from the apparent scope hereof.

I claim:

1. In combination, a shredding disk and a lawn mower comprising:
   a. a lawn mower with a shaft;
   b. top loading tube with a cap; and,
   c. a rotating shredding disk plate having shredding knives mounted on its top surface and having alternating large holes and small holes therethrough for passing shredded materials to below the disk plate.

2. In combination, a shredding disk and tube system for a lawn mower with a shaft comprising:
 a. top loading tube with a cap; and,
 b. shredding disk plate rotatably mounted on the shaft below the tube, having knives for shredding material, the disk plate including alternating large holes and small holes, therethrough for passing shredded material.

3. A shredder system for mounting on a lawn mower having a housing, a rotating central shaft within the housing and a grass cutting blade mounted on the shaft, comprising:
 a. a tube mounted on the housing for loading material to be shredded down into the housing; and,
 b. A shredding disk plate for mounting on the shaft above the cutting blade, the disk plate including shredding knives secured to its top surface, and the disk plate including holes therethrough for passing shredded material through the disk plate to the cutting blade below.

4. The shredder system of claim 3, wherein the holes in the shredding disk plate include alternating large and small holes.

5. A shredding lawn mower comprising:
 a. a housing;
 b. a feed tube mounted on the housing for feeding material to be shredded down into the housing;
 c. a central shaft rotatably mounted in the housing;
 d. a motor for rotating the shaft;
 e. a grass cutting bladed mounted on the shaft;
 f. a shredding disk mounted on the shaft above the cutting blade;
 g. shredding knives mounted on a top side of the shredding disk; and
 h. the shredding disk having holes therethrough for allowing material shredded by the shredding knives to pass downward through the rotating shredding disk to the cutting blade.

6. The lawn mower of claim 5 wherein the holes in the shredding disk vary in size.

7. The lawn mower of claim 5 wherein the holes in the shredding disk include alternating large and small holes.

* * * * *